United States Patent [19]

Sturm

[11] Patent Number: 4,693,415
[45] Date of Patent: Sep. 15, 1987

[54] METHOD AND CIRCUITRY FOR CONTROL OF A SANITARY MIXER FOR COLD AND HOT WATER

[75] Inventor: Hans-Josef Sturm, Friedrichsdorf, Fed. Rep. of Germany

[73] Assignee: Knebel & Rottger GmbH & Co., Iserlohn, Fed. Rep. of Germany

[21] Appl. No.: 864,158

[22] Filed: May 16, 1986

[30] Foreign Application Priority Data

May 23, 1985 [DE] Fed. Rep. of Germany ....... 3518645

[51] Int. Cl.$^4$ .......................................... G05D 23/185
[52] U.S. Cl. .................................. 236/12.12; 137/88; 4/192
[58] Field of Search ...................... 364/502; 236/12.11, 236/12.12; 4/192; 68/12 R, 207; 222/14; 137/88

[56] References Cited

U.S. PATENT DOCUMENTS 4,420,811 12/1983 Tarnay et al. .................. 137/561 R
4,528,709 7/1985 Getz et al. ............................ 364/400

Primary Examiner—William E. Wayner
Attorney, Agent, or Firm—Fisher, Christen & Sabol

[57] ABSTRACT

In a method for control of a sanitary mixer for cold and hot water, merely the actual temperature is continuously measured in the mixed water and compared to a preset temperature. At least two separate, time-varying regulating values, used for electromechanical adjustment both of the cold as well as of the hot water supply, are electronically derived from the difference between the set and actual temperature. A preset flow rate of the mixed water that is to be kept constant during temperature control is taken into account in the determination of the regulating values. Furthermore, partial flow rates for the cold water supply and hot water supply that are proportional to the regulating values can be determined from the time-varying regulating values. These are then used to continuously determine the instantaneous cumulative filling volume of the mixed water. As soon as a cumulative filling volume value equal to a preset cumulative filling volume is reached, the cold and hot water supplies can be shut off. In addition, a filling operation can be interrupted and resumed taking into account the filling volume drawn up to the interruption. In this way actuation of the cold and hot water valves is made possible via a simple temperature measurement while dispensing with the flow rate determination; in this case temperature, flow rate and/or filling volume can be preset.

16 Claims, 2 Drawing Figures

METHOD AND CIRCUITRY FOR CONTROL OF A SANITARY MIXER FOR COLD AND HOT WATER

BACKGROUND OF THE INVENTION

The invention involves a method of the control of a sanitary mixer for cold and hot water according to which temperature control is carried out by means of a comparison between the actual temperature of the mixed water and a preset temperature. Furthermore, the invention involves a circuit arrangement for the control of a mixer with a valve for cold and hot water supply, respectively, and the continuous regulation of the mixed water temperature to carry out the method.

Thermostatically controlled mixers, with which a piston valve is moved in an axial direction by an expansion element that in the opposite direction overrides a hot water and cold water intake opening in the mixer housing, are known for household purposes and sanitary facilities. The mixed water temperature is present from the outside by limiting the expansion path of the expansion element by operation of a setting knob. Volume control is carried out independently via a lever or turning handle that can be twisted from the outside, in which case the hot water and cold water inlet can be opened or closed together. The disadvantages of such circuit arrangements are the inertia of the control system and the resulting control inaccuracy.

BROAD DESCRIPTION OF THE INVENTION

The object of the present invention is to create a method for fully automatic and electronics control of mixer taps with which a functionally reliable, precise and rapid temperature and volume control can be achieved in a simple manner. In addition, this method is also intended to enable automatic setting of a preselectable, cumulative filling volume.

This objective is fulfilled by the invention by virtue of the fact that the actual temperature is continuously measured in the mixed water and that at least two separate time-varying regulating values, used for electromechanical adjustment both of the cold as well as of the hot water supply, are electronically derived from the difference between set and actual temperature and that a preset flow rate of the mixed water which is to be kept constant during temperature control is taken into account in the determination of the regulating values. Advantageous and preferred designs of the method involved in the invention are described below.

Preferably partial flow rates proportional to the regulating values are determined from the time-varying regulating values and are used to continuously determine the instantaneous cumulative filling volume of the mixed water, and when a cumulative filling volume value equal to a preset cumulative filling volume is reached, the regulating values are set to zero thus shutting off the cold and hot water supplies. At the beginning of the determination procedure for the cumulative filling volume, preferably the determination of the regulating values is started at the same time.

Preferably, by pressing a pause button the filling operation is interrupted and the value of the instantaneous filling volume of the mixed water is stored and by pressing the pause buttom a second time the filling operation is resumed taking into account the stored value of the cumulative filling volume of the mixed water. Preferably by starting a new filling operation the stored value of the instantaneous cumulative filling volume of the mixed water is cleared.

The determination procedure for the cumulative filling volume is preferably ended when a cumulative filling volume value equal to the preset cumulative filling volume is reached.

Preferably the standard values for set temperature, flow rate and cumulative filling volume of the mixed water as well as the previously determined regulating values corresponding to these standard values are stored and can be recalled.

The circuitry according to the invention is characterized by the fact that a control circuit is provided for control of the temperature of the mixed water while keeping a constant flow rate of the mixed water. By means of this control circuit, at least two regulating values for the actuation of at least two electromechanical valve drives can be derived after comparison of the actual temperature measured in the mixed water with the preset temperature using a control algorithm, and one of the regulating values can be derived from a value proportional to the preset flow rate by subtraction. Advantageous and preferred embodiments are described below.

Preferably a PID (proportional plus integral plus derivative action) controller is provided as the control algorithm.

Preferably the partial flow rates proportional to the regulating values can be determined from the time-varying regulating values via a function generator, an integrator is provided with which the cumulative, instantaneous filling volume can be determined from the partial flow rates, a comparator is provided for comparison of the instantaneous, cumulative filling volume with the preset cumulative filling volume and the control circuit can be switched off to determine the regulating values when the preset cumulative filling volume is reached. Preferably a start flip-flop circuit is provided for the integrator, and the control circuit can be switched on at the same time via the comparator to determine the regulating valves when the integrator is started.

BRIEF DESCRIPTION OF THE DRAWINGS

The invention is explained in more detail on the basis of the schematic drawings. In the drawings.

DETAILED DESCRIPTION OF THE INVENTION

Figure 1:
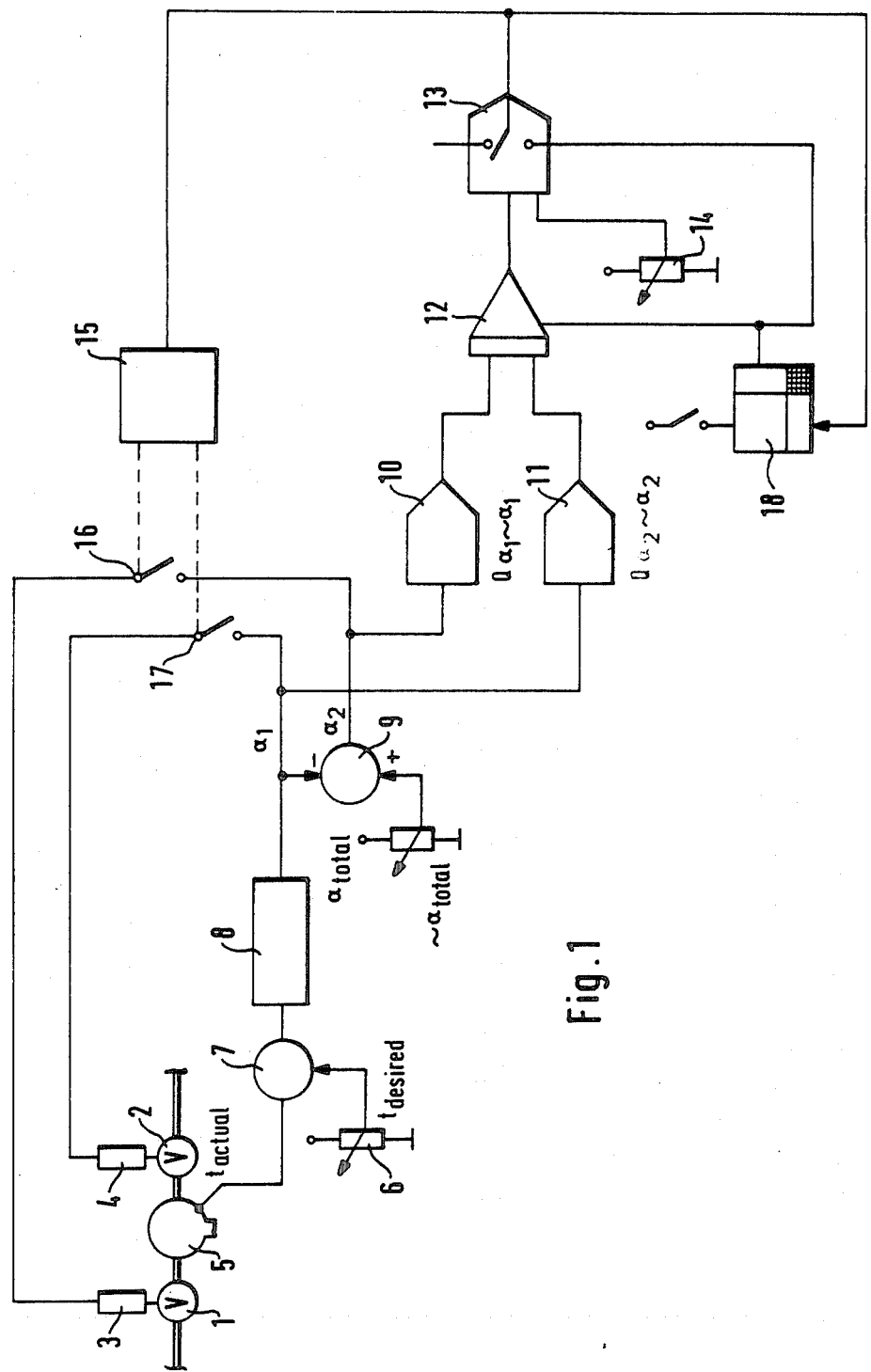
FIG. 1 is a schematic drawing of a control circuit to carry out the method according to the invention.

According to the invention, partial rate volume amounts can be determined for cold water and hot water supplies from the time-varying regulating values; these partial flow rates volumes are proportioned to the time-varying regulating values. They can then be used to continuously determine the instantaneous cumulative filling volume of the mixed water. When a cumulative filling volume valve is reached that is equal to a preset cumulative filling volume, the regulating values are set to zero and the cold water supply and hot water supply are thereby shut off.

It is advantageous that the determination of the regulating values is started simultaneously with the starting of the determination procedure for the cumulative filling volume. When a cumulative filling volume value is reached that is equal to the preset cumulative filling volume, the determination procedure for the cumulative filling volume is ended.

An additional advantage of the invention is that the filling operation can be interrupted by pressing the pause button, in which case the instantaneous cumulative filling volume of the mixed water is stored at the time of the interruption. Resumption of the filling operation while taking into account the filling volume already drawn and known from the stored value is possible by pressing the pause buttom again. In the case that an interrupted filling operation is not to be continued, the stored instantaneous cumulative filling volume of the mixed water is cleared by starting a new filling operation and the pause function is thus removed.

Preferably standard values for set temperature, flow rate and cumulative filling volume of the mixed water are stored. The previously determined regulating values corresponding to the above values are stored and can be recalled in the same way. This makes it possible to set the standard temperature, filling volume and flow rate without selecting them individually with a simple touch of a button, for example, when operating the valves to take a bath.

According to the invention, the cold and hot water valves are opened and closed electromechanically while dispensing with a flow rate determination by means of a simple temperature measurement in the mixed water. The flow rate of the mixed water is maintained at a constant level in this case. At the same time it is possible to preset a certain filling volume and automatically switch off the control circuit provided for temperature control after the desired filling volume is reached.

According to the invention the temperature measurement is carried out by means of a sensor mounted in a mixing chamber. Preferably the temperature is determined at the outlet of the mixing chamber in order to prevent inaccuracy as a result of insufficient mixing of the water flows.

In order to put the electronic control system proposed according to the invention into practice, a valve for the cold water supply as well as one for the hot water supply, both of which can be driven electromechanically, are necessary. The electromechanical drives for the two valves can be electric motors, such as stepper motors, D.C. or A.C. motors. Solenoid valves enabling analog adjustment of the opening angle can also be used. Solenoid valves that are operated via a variable break-make ratio thus enabling a quasi-analog mode of operation or hydraulic drives can also be used for this purpose.

The valves can be realized by means of several ceramic discs lying on top of each other. Such rotary disc valves, which can be operated electromechanically, are described, for example in German OS No. 3,041,979.

According to the invention, partial flow rates are determined from the time-varying regulating values, which are obtained via the control circuit mentioned. Appropriate function generators can be used for this purpose. The cumulative, instantaneous filling volume is then determined from the partial flow rates volume amounts in an integrator. The filling volume determined is then compared with the preset cumulative filling volume. When the preset cumulative filling volume is reached, the control circuit can be broken with the help of a breaker circuit.

A particularly advantageous embodiment provides a start flip-flop circuit for the integrator. At the same time the control circuit is switched on to determine the regulating values via the comparator when the integrator is started.

In the embodiment shown in FIG. 1, valves 1 and 2 are provided for cold and hot water supply and are driven by electric motors 3 and 4. The actual temperature measured in mixing chamber 5 and the set temperature that is set at 6 are compared in the subtracter 7. The regulating value $\alpha_1$ for the drive of valve 1 is formed from the deviation via a PID controller 8. Regulating value 0 is formed from regulating value $\alpha_1$ and a regulating signal $\alpha_{tot}$ proportional to the total flow volume Cat the ottput of subtracter circuit 9. It is known that the flow rate of the cold and hdt water not only depends on the opening angle of valves 1 and 2 but also on the difference in pressure between supply and dynamic pressure at the valve outlet. Here it is assumed that the supply pressures are constant with respect to time. The absolute value of the pressure levels is taken into account separately for hot and cold water branches by means of adjustable factors.

The partial flow rates $Q\alpha_1$ and $Q\alpha_2$ proportional to the regulating values are determined from the time-varying regulating values $\alpha_1$ and $\alpha_2$ determined in this control circuit by means of function by means of function generators 10 and 11. The outputs of the functional generators are led to integrator 12, with which the cumulative, instantaneous filling rates $Q\alpha_1$ can then be determined from the partial flow rate $Q\alpha_1$ $Q\alpha_2$. Comparator 13 connected to integrator 12 is provided for comparison of the instantaneous, cumulative filling volume and the cumulative filling volume preset at 14. As soon as the preset filling volume is reached, the control circuit can be broken via breaker circuit 15 for regulating value determination by means of switches 16 and 17.

According to a special embodiment, integrator 12 is started via start-stop flip-flop circuit 18. At the same time the control circuit can be switched on via comparator 13 for determination of the regulating values. As soon as the control circuit is broken after the desired filling volume is reached, integrator 12 is stopped by means of flip-flop circuit 18.

Figure 2:
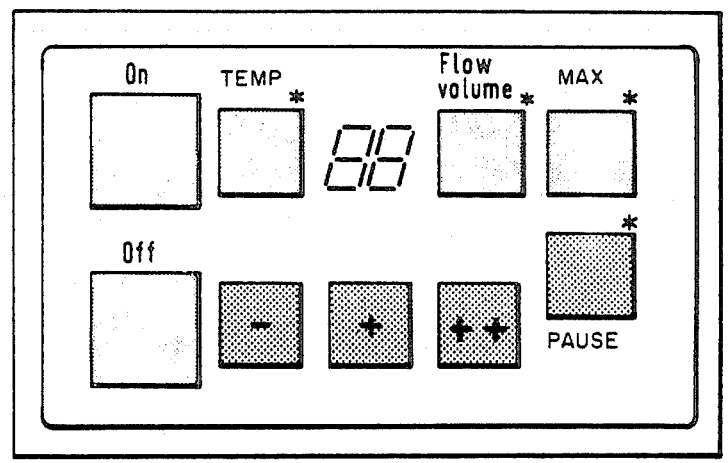
FIG. 2 is a schematic drawing of an indicator board for operation of the circuitry.

The control system according to the invention enables simple operation suitable for household purposes, as shown in the example in FIG. 2. Determination of the regulating values is started by pressing the buttons "on" and "off". The temperature can be set high or low by pressing the buttons "Temp" and "+" or "−"respectively. Setting of the flow volume is carried out in the same way. If, contrary to the rule, very high temperatures are desired, the ++button is pressed. The "Max" button is provided for the maximum cumulative filling volume, e.g., for a bath. A filling operation in progress can be interrupted by means of the "Pause" button. A digital display is provided between the "Temp" and "Vol" buttons and is used to indicate the respectively inputted numerical values. The buttons marked with an asterisk (*) are preferably provided in the form of light-emitting diodes.

What is claimed is:

1. Method for control of a sanitary mixer for cold and hot water by carrying out temperature control by means of a comparison between the actual temperature of the mixed water and a preset temperature, comprising:

continuously measuring the actual temperature in the mixed water and electronically deriving at least two separate, time-varying regulating values, used for electromechanical adjustment both of the cold water supply as well as of the hot water supply, from the difference between the set temperature and the actual temperature and taking into account preset flow rate of the mixed water to be kept constant during temperature control in the determination of the regulating valves; and determining from the time-varying regulating values partial flow rates proportional to the regulating values, continuously determining from the partial flow rates the instantaneous cumulative filling volume of the mixed water, and, when a cumulative filling volume value equal to a preset cumulative filling volume is reached, setting the regulatingvalues to zero, thus shutting off the cold water supply and the hot water supply.

2. Method according to calim 1 wherein at the beginning of the determination procedure for the cumulative filling volume the determination of the regulating values is started at the same time.

3. Method according to claim 1 wherein by pressing a pause button the filling operation is interrupted and the value of the instantaneous filling operation is interrupted and the value of the instantaneous filling volume of the mixed water is stored and by pressing the pause button a second time the filling operation is resumed taking into account the stored value of the cumulative filling volume of the mixed water.

4. Method according to claim 1 wherein the determination procedure for the cumulative filling volume is ended when a cumulative filling volume value equal to the preset cumulative filling volume is reached.

5. Method according to claim 1 wherein standard values for set temperature, rate and cumulative filling volume of the mixed water as well as the previously determined regulating values corresponding to these standard values are stored and can be recalled.

6. Circuitry for control of a sanitary mixer with a valve each for the cold water supply and the hot water supply and continuous regulation of the mixed water temperature to carry out the method according to claim 1 comprising: a control circuit to regulate the temperature of the mixed water while keeping the flow rate of the mixed water constant, by means of this control circuit, at least two regulating values for the actuation of at least two electromechanical valve drives can be derived after comparison of the actual temperature measured in the mixed water with the preset temperature using a control alogorithm, and one of the regulating values can be derived from a value proportional to the preset flow volume by subtraction 7. Circuit for control of a sanitary mixer with a valve each for the cold water supply and the hot water supply and continuous regulation of the mixed water temperature to carry out the method according to claim 1 comprising: a control circuit to regulate the temperature of the mixed water while keeping the flow rate of the mixed water constant, by means of this control circuit, at least two regulating values for the actuation of at least two electromechanical valve drives can be derived after comparision of the actual tempe-ature measured in the mlxed water with the preset temperature using a control algorithm in the form of a PID (proportional plus integral plus derivative action) controller, and one of the regulating values can be derived from a value proportional to the preset flow volume by subtraction.

8. Circuitry according to claim 7 wherein the partial flow rates porportional to the regulating valves can be deteried from the time-varying regulating valves via a function generator, an integrator is provided with which the cumulative, instantaneous filling volume is determined from the partial flow rates, a comparator is provided for comparison of the instantaneous, cumulative filling volume with the preset cumulative filling volume and the control circuit is switched off to determine the reglulating values when the preset cumulative filling volume is reached.

9. Circuitry according to claim 8 wherein a start flip-flop circuit is provided for the integrator and that the control circuit can be switched on at the same time via the comparator to determine the regulating values when the integrator is started.

10. Circuitry for control of a sanitary mixer with a valve each for the cold water supply and the hot water supply and continous regulation of the mixed water temperature to carry out the method according to claim 1 comprising: a control circuit to regulate the temperature of the mixed water while keeping the flow rate of the mixed water constant, by means of this control circuit, at least two regulating values for the actuation of at least two electromechanical valve drives can be derived after comparison of the actual temperature measured in the mixed water with the preset temperature using a control algorithm and one of the regulating values can be derived from a value proportional to the preset flow volume by subtraction, wherein the partial flow roportional to the regulating values are determined W from the time-varying regulating values via a function generator the cumulative, instantaneous filling volume is determined from the partial flow volumes, a comparator is provided for comparison of the instanteous, cumulative filling volume with the preset cumulative filling volume and the control circuit is switched off to determine the regulating values when the Preset cumulative filling volume is reached.

11. Circuitry for control of a sanitary mixer with a valve each for the cold water supply and the hot water supply and continiuous regulation of the mixed water temperature to carry out the method according to claim 1 comprising: a control crcuit to regulate the temperature of themixed water while keeping the flow rate of the mixed water constant, by means of this control circuit, at least two regulating values for the actuation of at least two electromechanical valve drives can be derived after comparison of the actual temperature measured in the mixed water with the preset temperature using a control algorithm and one of the regulating values can be derived from a value Proportional to the preset flow volume by subtraction, wherein a start flip-flop circuit is provided for the integrator and the control circuit is switched on at the same time via the comparator to determine the regulating values whenthe integrator is started.

12. Method for control of a sanitary mixer for cold and hot water by carrying out temperature control by means of a comparison between the actual temperature of the mixed water and a preset temperature, comprising:

continuously measuring the actual temperature in the mixed water and electronically deriving at least two separate, time-varying regulating values, used for electromechanical adjustment both of the cold water supply as well as of the hot water supply, from the difference between the set temperature and the actual temperature and taking into account a preset flow rate of the mixed water to be kept constant during temperature control in the determination of the regulating values; and determining from the time-varying regulating values partial flow rates proportional to the regulating values, continuously determining from the partial flow rates the instantaneous cumulative filling volume of the mixed water, and, when a cumulative filling volume value equal to a preset cumulative filling volume is reached, setting the regulating values to zero, thus shutting off the cold water supply and the hot water supply, wherein, at the beginning of the determination procedure for the cumulative filling volume, the determination of the regulating values is started at the same time.

13. Method according to claim 12 wherein by pressing a pause button the filling operation is interrupted and the value of the instantaneous filling volume of the mixed water is stored and by pressing the pause button a second time the filling operation is resumed taking into account the stored value of the cumulative filling volume of the mixed water.

14. Method according to claim 4 wherein by starting a new filling operation the stored value of the instantaneous cumulative filling volume of the mixed water is cleared.

15. Method according to claim 5 wherein the determination procedure for the cumulative filling volume is ended when a cumulative filling volume equal to the preset cumulative filling volume is reached.

16. Method according to claim 6 wherein standard values for set temperature, flow rate and cumulative filling volume of the mixed water as well as the previously delermined regulating values corresponding to these standard values are stored and can be recalled.

* * * * *